(12) United States Patent
Kim

(10) Patent No.: US 12,127,701 B2
(45) Date of Patent: Oct. 29, 2024

(54) TWIN GEAR JUICER

(71) Applicant: I-TECH USA, INC., Farmington Hills, MI (US)

(72) Inventor: Dong Un Kim, Northville, MI (US)

(73) Assignee: I-TECH USA, INC., Farmington Hills, MI (US)

(*) Notice: Subject to any disclaimer, the term of this patent is extended or adjusted under 35 U.S.C. 154(b) by 0 days.

(21) Appl. No.: 17/333,241

(22) Filed: May 28, 2021

(65) Prior Publication Data

US 2021/0369036 A1 Dec. 2, 2021

Related U.S. Application Data

(60) Provisional application No. 63/031,670, filed on May 29, 2020.

(51) Int. Cl.
| | | |
|---|---|---|
| *A47J 19/02* | (2006.01) | |
| *A23L 2/04* | (2006.01) | |
| *B02C 4/08* | (2006.01) | |

(52) U.S. Cl.
CPC ............... *A47J 19/025* (2013.01); *A23L 2/04* (2013.01); *B02C 4/08* (2013.01)

(58) Field of Classification Search
CPC ........ A47J 19/025; A47J 19/06; A47J 19/023; A47J 19/027; A23N 1/00; A23N 1/02; B30B 9/16; B30B 9/26; B30B 9/12; B30B 9/18; B30B 9/20; A23L 2/04; B02C 4/08
USPC .................. 99/495, 510, 513; 426/481, 489; 366/272, 301, 84, 291, 299, 300; 100/117, 145, 98 R, 37
See application file for complete search history.

(56) References Cited

U.S. PATENT DOCUMENTS

| | | |
|---|---|---|
| 5,156,872 A | 10/1992 | Lee |
| 5,381,730 A | 1/1995 | Kim |
| 5,452,650 A | 9/1995 | Lee |

(Continued)

FOREIGN PATENT DOCUMENTS

| | | | |
|---|---|---|---|
| KR | 940020965 A | 10/1994 | |
| KR | 200166556 Y1 | 2/2000 | |

(Continued)

OTHER PUBLICATIONS

KR 20110006829 U (Year: 2011).*

(Continued)

*Primary Examiner* — Vy T Nguyen
(74) *Attorney, Agent, or Firm* — Jacob M. Ward; Ward Law Office LLC

(57) ABSTRACT

A juicer for juicing produce can have a first juicing gear. The first juicing gear can include a first main body. The first main body can be configured to rotate in a first direction. The main body can have a plurality of first teeth. The first teeth can include a first top surface with a first exposed cavity. The first exposed cavity can be formed on the first top surface of the first teeth. The first exposed cavity can include a first leading edge. The first leading edge can be configured bite the portion of the produce from a remainder of the produce, as the juicing gear rotates in the first direction. The first teeth can be configured to crush the portion of the produce and/or the remainder of the produce, as the juicing gear rotates in the first direction, thereby releasing juice from the produce.

16 Claims, 6 Drawing Sheets

(56) References Cited

U.S. PATENT DOCUMENTS

2022/0322864 A1* 10/2022 Kim ........................ A47J 19/06

FOREIGN PATENT DOCUMENTS

WO      2015161815 A1    10/2015
WO      2020258237 A1    12/2020

OTHER PUBLICATIONS

AT 508946 B1 (Year: 2013).*
KR 200362953 Y1 (Year: 2003).*
KR 20110006831 U (Year: 2011).*
KR 200362953 (Year: 2004).*
Written Opinion of the International Searching Authority dated Sep. 15, 2021.

* cited by examiner

TWIN GEAR JUICER

CROSS-REFERENCE TO RELATED APPLICATIONS

This application claims the benefit of U.S. Provisional Application Ser. No. 63/031,670, filed on May 29, 2020. The entire disclosure of the above application is incorporated herein by reference.

FIELD

The present disclosure relates to juice extractors, and more particularly, to gears for a juice extractor.

INTRODUCTION

This section provides background information related to the present disclosure which is not necessarily prior art.

A juicer, also known as a juice extractor, is a tool used to extract juice from fruits, herbs, leafy greens, and other types of vegetables in a process called juicing. Juicers can be configured crush, grind, and/or squeeze the juice out of the pulp. Juicers can be configured to separate the pulp and other fibrous material from a final product of liquid juice.

A twin gear juicer, also known as a triturating juicer, has two rotating gears that interlock and rotate inwardly. A user can position various types of vegetation, such as fruits and vegetables, into contact with the rotating gears. This results in the rotating gears crushing and grinding the vegetation into particles, thereby extracting the juice from the vegetation, and separating out the pulp from the vegetation.

Twin gear juicers can be used for juicing wheat, grass, and other herbage. However, it can be very difficult to juice carrots, apples, celery, and other sturdier vegetation. For example, juicing a carrot with a twin gear juicer can require a significant amount of force from the user in order to press the carrot between the rotating gears, where it can be necessary to maintain such force to completely process the carrot. Undesirably, this can make the process of juicing sturdier vegetation, like carrots, a physically straining process for the user.

There is a continuing need for a juicer that facilitates juicing of sturdy produce. Desirably, the juicer should militate against physical strain on the user during the juicing operation.

SUMMARY

In concordance with the instant disclosure, a juicer that facilitates juicing of sturdy produce, and which can militate against physical strain experienced by a user during the juicing operation, has been surprisingly discovered.

In certain embodiments, juicers for juicing produce can have a first juicing gear. The first juicing gear can include a first main body. The first main body can be configured to rotate in a first direction. The main body can have a plurality of first teeth. The first teeth can include a first top surface with a first exposed cavity. The first exposed cavity can be formed on the first top surface of the first teeth. The first exposed cavity can be configured to receive a portion of the produce. The first exposed cavity can include a first leading edge. The first leading edge can be configured bite the portion of the produce from a remainder of the produce, as the juicing gear rotates in the first direction. The first teeth can be configured to crush the portion of the produce and/or the remainder of the produce, as the juicing gear rotates in the first direction, thereby releasing juice from the produce.

In certain embodiments, juicers for juicing a produce can have a first juicing gear and a second juicing gear. The first juicing gear can include a first main body. The first man body can be configured to rotate in a first direction. The first main body can have a plurality of first teeth. The first teeth can have a first top surface with a first exposed cavity. The first exposed cavity can be formed on the first top surface of the teeth. The first exposed cavity can be configured to receive a portion of the produce. The first exposed cavity can have a first leading edge. The second juicing gear can have a second main body. The second main body can be configured to rotate in a second direction, where the second direction can be opposite to the first direction. The second main body can have a plurality of second teeth. The second teeth can include a second top surface with a second exposed cavity. The second exposed cavity can be formed on the second top surface of the second teeth. The second exposed cavity can be configured to receive the portion of the produce. The second exposed cavity can have a second leading edge. The first leading edge and the second leading edge can be configured to bite the portion of the produce from a remainder of the produce, as the first juicing gear rotates in the first direction and the second juicing gear rotates in the second direction. The first teeth and the second teeth can be configured to crush at least one of the portion of the produce and the remainder of the produce, as the first juicing gear rotates in the first direction and the second juicing gear rotates in the second direction, thereby releasing juice from the produce.

In certain embodiments, methods for using the juicer for juicing the produce can include a step of providing the juicer. The first juicing gear can be rotated in the first direction and the second juicing gear can be rotated in the second direction. The produce can be disposed in the first exposed cavity and the second exposed cavity periodically, as the first juicing gear rotates in the first direction and the second juicing gear rotates in the second direction, where the second direction can be opposite the first direction. The first leading edge and the second leading edge can bite the portion of the produce from the remainder of the produce, as the first juicing gear rotates in the first direction and the second juicing gear rotates in the second direction. The first teeth and the second teeth can crush the portion of the produce and/or the remainder of the produce, as the first juicing gear rotates in the first direction and the second juicing gear rotates in the second direction, thereby releasing the juice from the produce.

Further areas of applicability will become apparent from the description provided herein. It should be understood that the description and specific examples are intended for purposes of illustration only and are not intended to limit the scope of the present disclosure.

DRAWINGS

The above, as well as other advantages of the present disclosure, will become readily apparent to those skilled in the art from the following detailed description, particularly when considered in the light of the drawings described herein.

Figure 10:
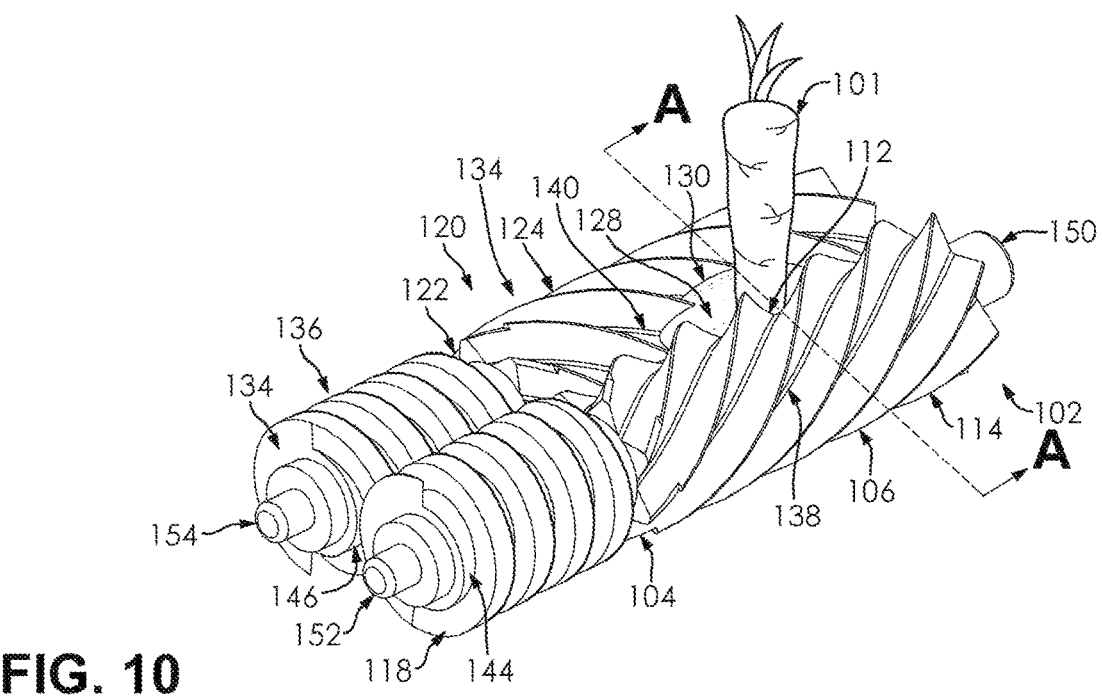
FIG. 10 is a top perspective view of the first juicing gear and the second juicing with a portion of produce disposed in the produce aperture.
Figure 11:
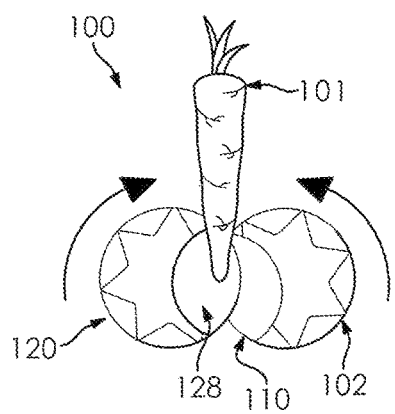
Figure 12:
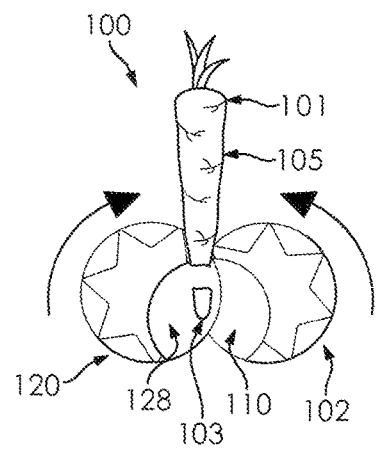
Figure 13:
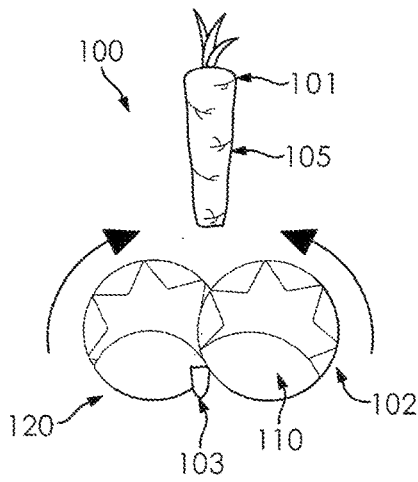
Figure 14:
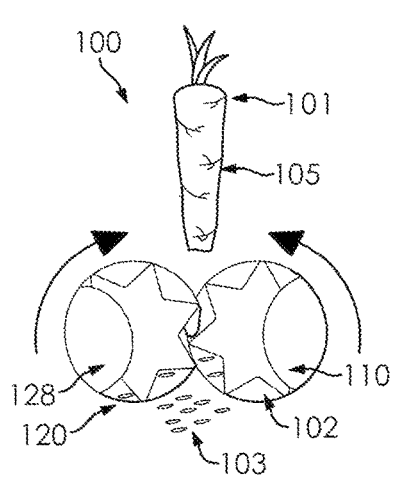
Figure 15:
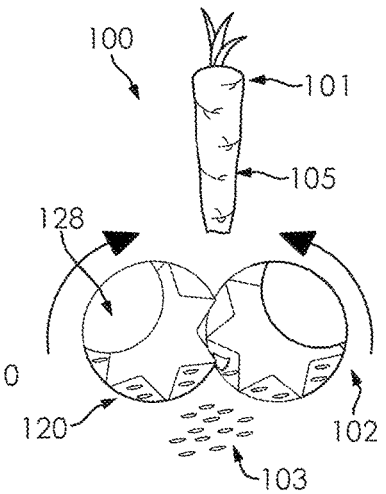
Figure 16:
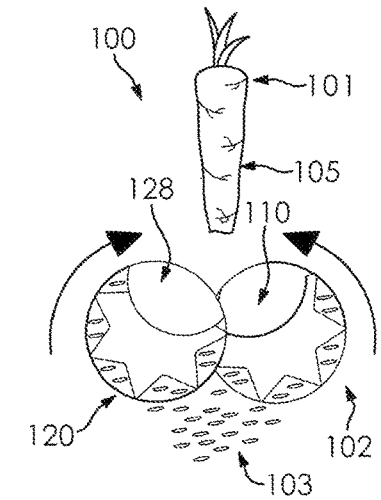
Figure 17:
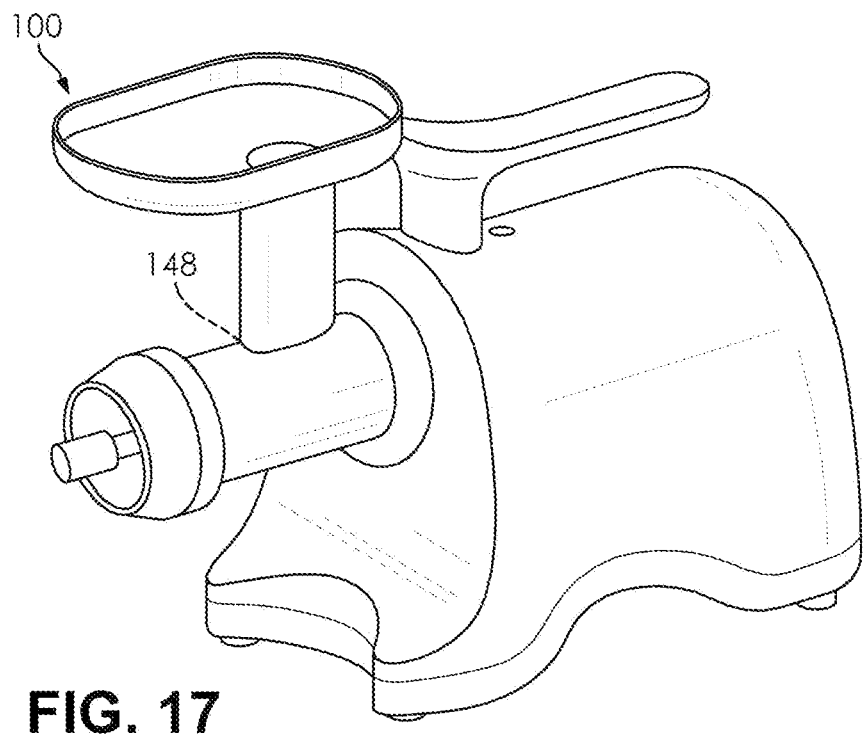
Figure 18:
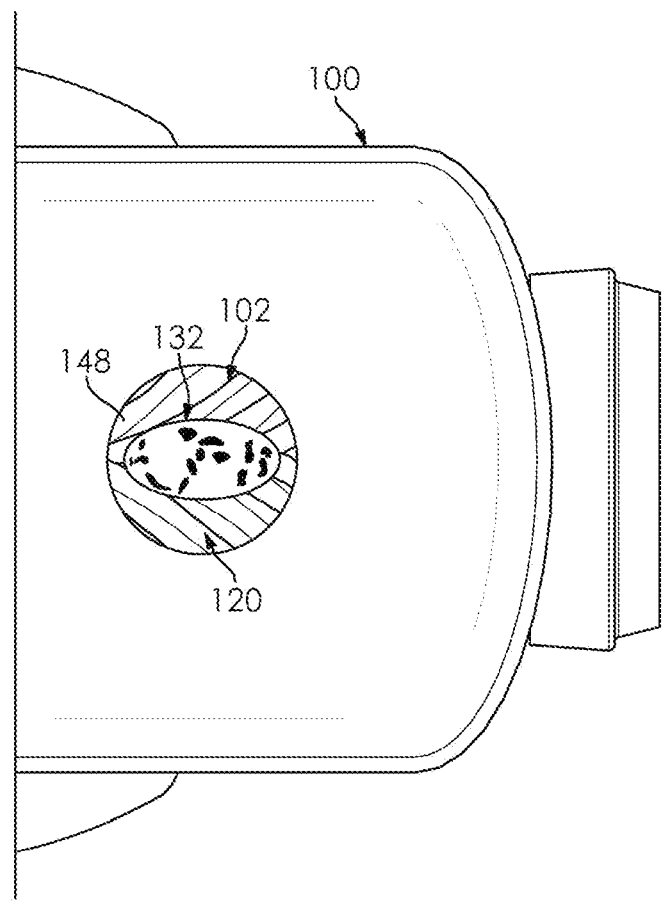
Figure 19:
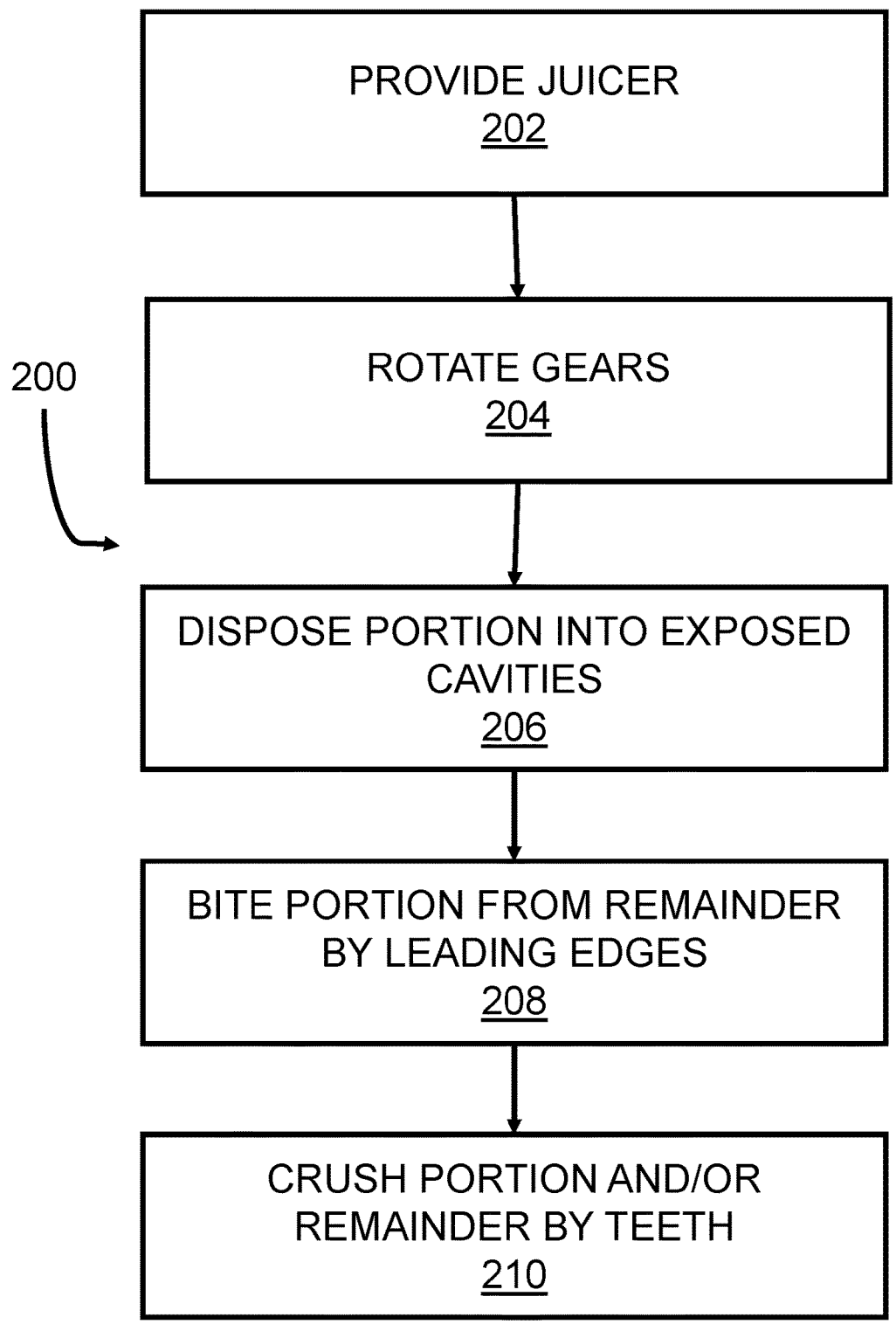

FIG. 11 is a schematic cross-sectional view of the first juicing gear and the second juicing gear taken at section line A-A in FIG. 10, and showing the portion of the produce disposed in the produce aperture, where counter-rotation of the first juicing gear and the second juicing gear are indicated by the arrows and depictions of the first juicing gear and the second juicing gear are simplified for the purpose of clarify for the cross-sectional view;

FIG. 12 is a schematic cross-sectional view of the first juicing gear and the second juicing gear shown in FIG. 11, following partial counter-rotation, where the portion of the produce is separated from a remainder of the produce;

FIG. 13 is a schematic cross-sectional view of the first juicing gear and the second juicing gear shown in FIG. 12, following further partial counter-rotation, where the portion of the produce is falling between the first juicing gear and the second juicing gear;

FIG. 14 is a schematic cross-sectional view of the first juicing gear and the second juicing gear shown in FIG. 13, following further partial counter-rotation, where the portion of the produce is being crushed by the plurality of first teeth and a plurality of second teeth of the second juicing gear;

FIG. 15 is a schematic cross-sectional view of the first juicing gear and the second juicing gear shown in FIG. 14, following further partial counter-rotation, where the portion of the produce is being crushed more by the plurality of first teeth and the plurality of second teeth;

FIG. 16 is a schematic cross-sectional view of the first juicing gear and the second juicing gear shown in FIG. 15, following further partial counter-rotation, where the portion of the produce has been substantially crushed by the plurality of first teeth and the plurality of second teeth;

FIG. 17 is a top perspective view of a juicer, according to certain embodiments;

FIG. 18 is a top plan view of the juicer shown in FIG. 16, showing the produce aperture disposed adjacent to an inlet aperture, and further showing a remainder of produce disposed beneath the produce aperture; and FIG. 19 is a flowchart illustrating a method using the juicer, according to an embodiment of the present disclosure.

DETAILED DESCRIPTION

The following description of technology is merely exemplary in nature of the subject matter, manufacture, and use of one or more inventions, and is not intended to limit the scope, application, or uses of any specific invention claimed in this application or in such other applications as can be filed claiming priority to this application, or patents issuing therefrom. Regarding methods disclosed, the order of the steps presented is exemplary in nature, and thus, the order of the steps can be different in various embodiments, including where certain steps can be simultaneously performed.

The terms "a" and "an" as used herein indicate "at least one" of the item is present; a plurality of such items can be present, when possible. Except where otherwise expressly indicated, all numerical quantities in this description are to be understood as modified by the word "about" and all geometric and spatial descriptors are to be understood as modified by the word "substantially" in describing the broadest scope of the technology. The term "about" when applied to numerical values indicates that the calculation or the measurement allows some slight imprecision in the value (with some approach to exactness in the value; approximately or reasonably close to the value; nearly). If, for some reason, the imprecision provided by "about" and/or "substantially" is not otherwise understood in the art with this ordinary meaning, then "about" and/or "substantially" as used herein indicates at least variations that can arise from ordinary methods of measuring or using such parameters.

Although the open-ended term "comprising," as a synonym of non-restrictive terms such as including, containing, or having, is used herein to describe and claim embodiments of the present technology, embodiments can alternatively be described using more limiting terms such as "consisting of" or "consisting essentially of" Thus, for any given embodiment reciting materials, components, or process steps, the present technology also specifically includes embodiments consisting of, or consisting essentially of, such materials, components, or process steps excluding additional materials, components or processes (for consisting of) and excluding additional materials, components or processes affecting the significant properties of the embodiment (for consisting essentially of), even though such additional materials, components or processes are not explicitly recited in this application.

Disclosures of ranges are, unless specified otherwise, inclusive of endpoints and include all distinct values and further divided ranges within the entire range. Thus, for example, a range of "from A to B" or "from about A to about B" is inclusive of A and of B. Disclosure of values and ranges of values for specific parameters (such as amounts, weight percentages, etc.) are not exclusive of other values and ranges of values useful herein. It is envisioned that two or more specific exemplified values for a given parameter can define endpoints for a range of values that can be claimed for the parameter. For example, if Parameter X is exemplified herein to have value A and also exemplified to have value Z, it is envisioned that Parameter X can have a range of values from about A to about Z. Similarly, it is envisioned that disclosure of two or more ranges of values for a parameter (whether such ranges are nested, overlapping, or distinct) subsume all possible combination of ranges for the value that might be claimed using endpoints of the disclosed ranges. For example, if Parameter X is exemplified herein to have values in the range of 1-10, or 2-9, or 3-8, it is also envisioned that Parameter X can have other ranges of values including 1-9, 1-8, 1-3, 1-2, 2-10, 2-8, 2-3, 3-10, 3-9, and so on.

When an element or layer is referred to as being "on," "engaged to," "connected to," or "coupled to" another element or layer, it can be directly on, engaged, connected, or coupled to the other element or layer, or intervening elements or layers can be present. In contrast, when an element is referred to as being "directly on," "directly engaged to," "directly connected to" or "directly coupled to" another element or layer, there can be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. can be used herein to describe various elements, components, regions, layers and/or sections, these elements, components, regions, layers and/or sections should not be limited by these terms. These terms can be only used to distinguish one element, component, region, layer or section from another region, layer, or section. Terms such as "first," "second," and other numerical terms when used herein do not imply a sequence or order unless clearly indicated by the context. Thus, a first element, component, region, layer, or section discussed below could be termed a second element, component, region, layer, or section without departing from the teachings of the example embodiments.

Spatially relative terms, such as "inner," "outer," "beneath," "below," "lower," "above," "upper," and the like, can be used herein for ease of description to describe one element or feature's relationship to another element(s) or feature(s) as illustrated in the figures. Spatially relative terms can be intended to encompass different orientations of the device in use or operation in addition to the orientation depicted in the figures. For example, if the device in the figures is turned over, elements described as "below", or "beneath" other elements or features would then be oriented "above" the other elements or features. Thus, the example term "below" can encompass both an orientation of above and below. The device can be otherwise oriented (rotated 90 degrees or at other orientations) and the spatially relative descriptors used herein interpreted accordingly.

With reference to FIGS. 1-18, a juicer 100 for juicing produce 101 can include a first juicing gear 102. The first juicing gear 102 can include a first main body 104. The first main body 104 can be configured to rotate in a first direction. It should be appreciated that the rotation of the first main body 104 can be accomplished using a variety of methods. Non-limiting examples can include driving the first main body 104 via a motor or by manually turning or cranking the first main body 104. A skilled artisan can select other methods for driving the first juicing gear 102, as desired. The first main body 104 can be manufactured from various metals, metal alloys, ceramics, wood, or composite materials. However, it should be appreciated that one skilled in the art can employ other materials for the first main body 104, within the scope of the disclosure.

While still referring to FIGS. 1-16 and 18, the first main body 104 can have a plurality of first teeth 106. When the produce 101 is disposed adjacent to the first juicing gear 102 by a user, the first teeth 106 can be configured to contact and crush a portion 103 of the produce 101 and/or the produce 101 upon the first juicing gear 102 rotating in the first direction, as shown in FIG. 14-16. Desirably, the first teeth 106 can crush the portion 103 of the produce 101 and/or the produce 101 into particles to release juice from the produce 101. Referring now to FIGS. 1-16 and 18, in certain embodiments, the first teeth 106 can have a helical configuration with each of the first teeth 106 having a first slanted tooth trace. It is believed that the helical configuration and the first slanted tooth trace can facilitate crushing the produce 101 into fine particles to release the juice. However, it should be appreciated that one skilled in the art can employ other configurations for the first teeth 106.

Figure 1:
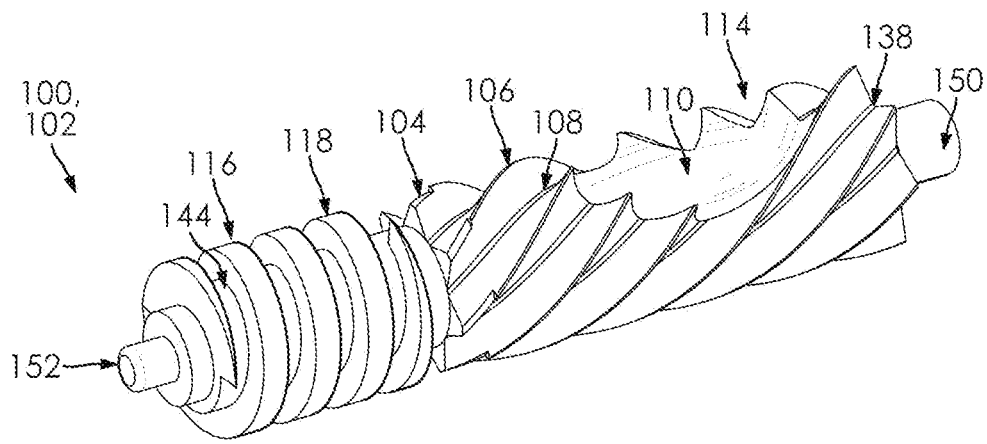
FIG. 1 is a top perspective view of a first juicing gear, according to an embodiment of the disclosure, having a first gear portion with a plurality of first teeth and a first exposed cavity.
Figure 2:
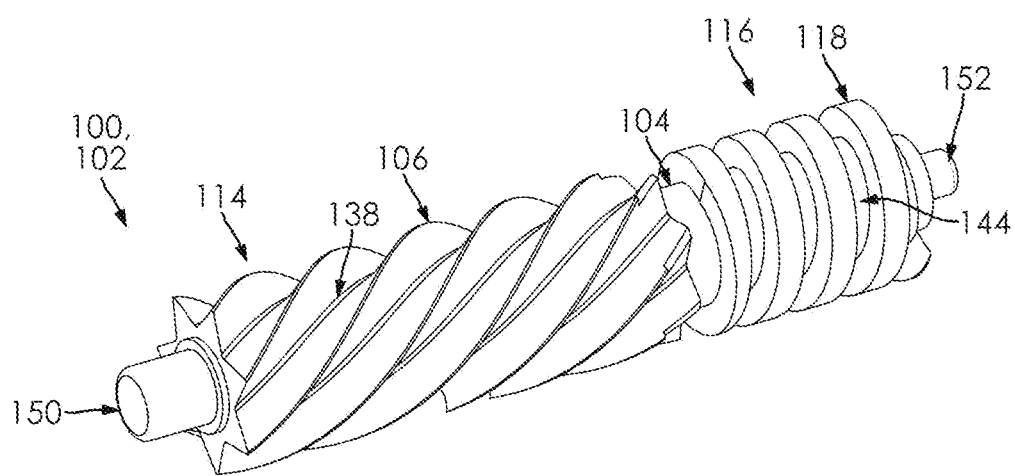
FIG. 2 is a bottom perspective view of the first juicing gear, as shown in FIG. 1, having a first screw portion with a first thread.
Figure 3:
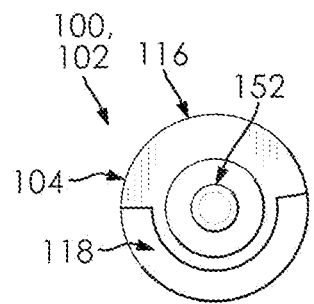
FIG. 3 is a front elevational view of the first juicing gear, as shown in FIGS. 1-2.
Figure 4:
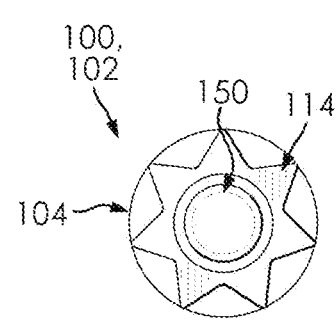
FIG. 4 is a rear elevational view of the first juicing gear, as shown in FIGS. 1-3.
Figure 5:
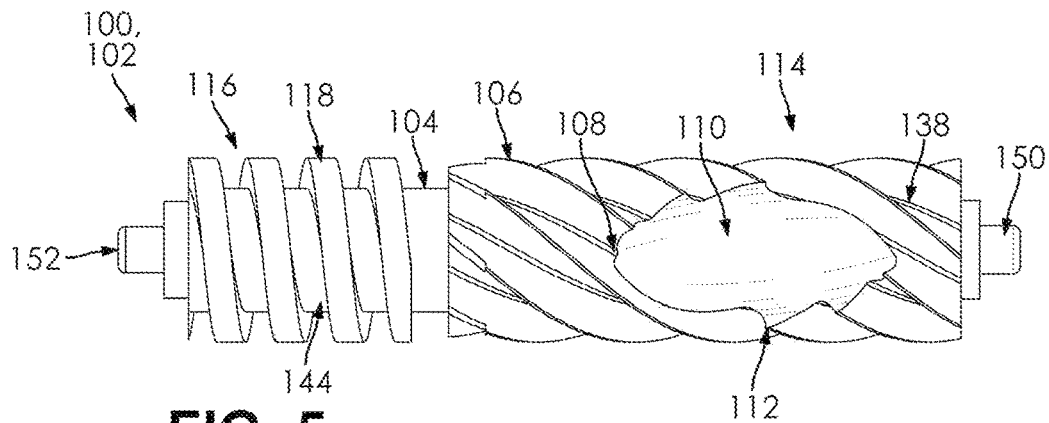
FIG. 5 is top plan view of the first juicing gear, as shown in FIGS. 1-4, showing the first cavity formed on a top surface of the first teeth.
Figure 6:
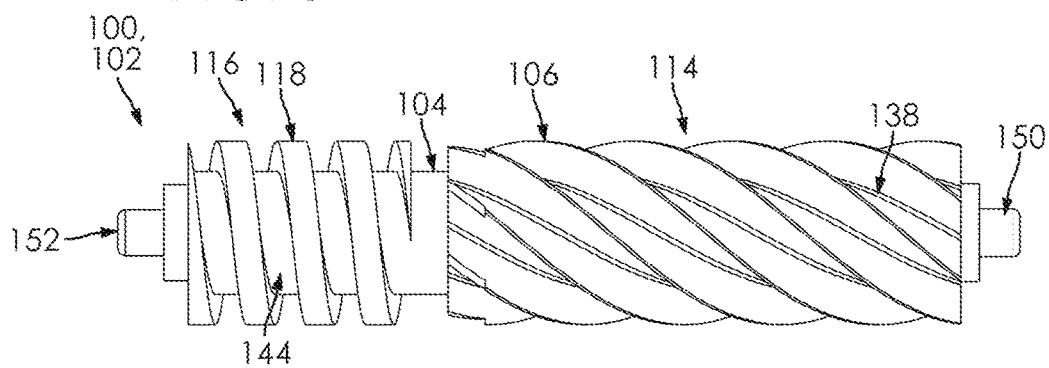
FIG. 6 is a bottom plan view of the first juicing gear, as shown in FIGS. 1-5.
Figure 7:
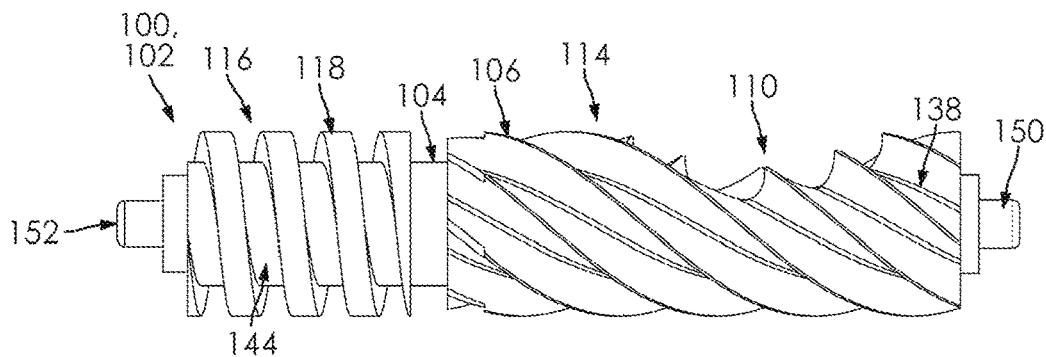
FIG. 7 is a right side elevational view of the first juicing gear, as shown in FIGS. 1-6.
Figure 8:
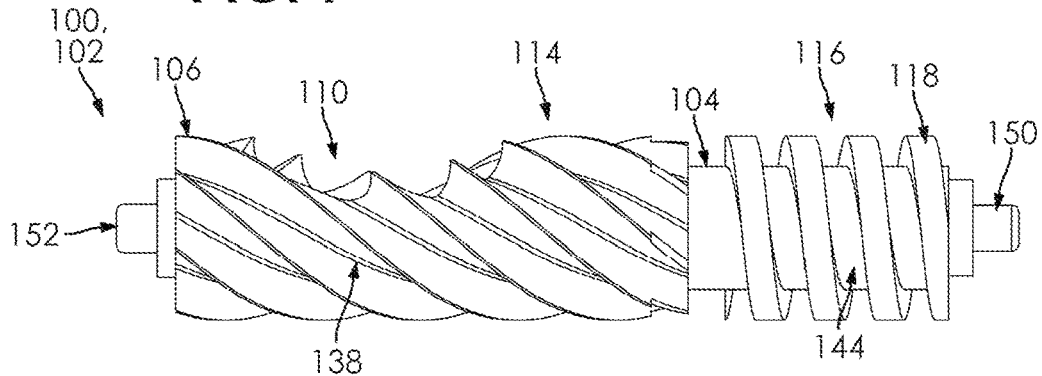
FIG. 8 is a left side elevational view of the first juicing, as shown in FIGS. 1-7.

Now referencing FIGS. 1 and 5, the plurality of first teeth 106 can include a first top surface 108 with a first exposed cavity 110. The first exposed cavity 110 can be formed in the first top surface 108. The first exposed cavity 110 can be configured to receive a portion 103 of the produce 101, as shown in FIGS. 10 and 11. While referencing FIGS. 1 and 5, the first exposed cavity 110 can have a first leading edge 112. The first leading edge 112 can be configured to bite or dig into the produce 101 periodically upon the first juicing gear 102 rotating in the first direction, thereby separating, cutting, or splitting the portion 103 of the produce 101 from a remainder 105 of the produce 101, as shown in FIGS. 10-13. In other words, the first leading edge 112 can facilitate separating the portion 103 or a chunk from the remainder 105 of the produce 101 or the remainder 105 of the produce 101 each revolution of the first juicing gear 102. Desirably, once the portion 103 of the produce 101 is separated from the remainder 105 of the produce 101, the portion 103 of the produce 101 can be ground and juiced by the first teeth 106 without requiring the user to hold the portion 103 of produce 101 against the first teeth 106. This can reduce the amount of force needed to hold the produce 101 adjacent to the first juicing gear 102.

With reference to FIGS. 1-10, the first main body 104 of the first juicing gear 102 can include a first grinding portion 114 and a first screw portion 116. The first grinding portion 114 can include the first teeth 106 with the first top surface 108 and the first exposed cavity 110. The first screw portion 116 can include a first thread 118. The first thread 118 can be configured to squeeze, press, and/or knead the portion 103 of the produce 101 and/or the remainder 105 of the produce 101, as the first juicing gear 102 rotates in the first direction. In certain examples, the first thread 118 can be configured to push pulp, which can result from juicing and crushing the produce 101 into particles, away from the first grinding portion 114. Desirably, this can allow the pulp to be separated from the juice, which can be beneficial for users who want to avoid consuming the pulp.

With reference to FIGS. 9-16, the juicer 100 can further include a second juicing gear 120. The second juicing gear 120 can be disposed adjacent to the first juicing gear 102. The second juicing gear 120 can be similar or identical to the first juicing gear 102 in structure and function. In certain embodiments, the second juicing gear 120 can be different from the first juicing gear 102. In certain embodiments, portions of the second juicing gear 120 can be configured as mirror images of the first juicing gear 102. The second juicing gear 120 can have a second main body 122. The second main body 122 can be configured to rotate in a second direction, where the second direction is opposite the first direction in which the first juicing gear 102 rotates. For example, the first juicing gear 102 can rotate counterclockwise, while the second juicing gear 120 can rotate clockwise. Desirably, this can permit the produce 101 to be pulled between the first juicing gear 102 and the second juicing gear 120, thereby crushing the produce 101 by being sandwiched between the first juicing gear 102 and the second juicing gear 120, as shown in FIGS. 10-16. Certain embodiments include where the first juicing gear 102 and the second juicing gear 120 are configured to be counter-rotating.

It should be appreciated that the rotation of the second main body 122 can be accomplished using a variety of methods. Non-limiting examples can include driving the second main body 122 via a motor or by manually turning or cranking the second main body 122. In certain examples, the second main body 122 can drive the first main body 104, or vice versa, as will be discussed in further detail below. A skilled artisan can select other methods for driving the second juicing gear 120, as desired. The second main body 122 can be manufactured from various metals, metal alloys, ceramics, wood, or composite materials. However, it should be appreciated that one skilled in the art can employ other materials for the second main body 122, within the scope of the disclosure.

Referring to FIGS. 9-16, the second main body 122 can include a plurality of second teeth 124. The plurality of second teeth 124 can be identical or similar to the function and structure of the first teeth 106. The second teeth 124 can interlock with the first teeth 106. Advantageously, this can allow the produce 101 to be crushed between the first teeth 106 and the second teeth 124, as the first juicing gear 102 is rotated in the first direction and the second juicing gear 120 is rotated in the second direction. In certain embodiments, the second teeth 124 can have the helical configuration with each of the second teeth 124 having a second slanted tooth trace to facilitate crushing the produce 101 into fine particles.

Figure 9:
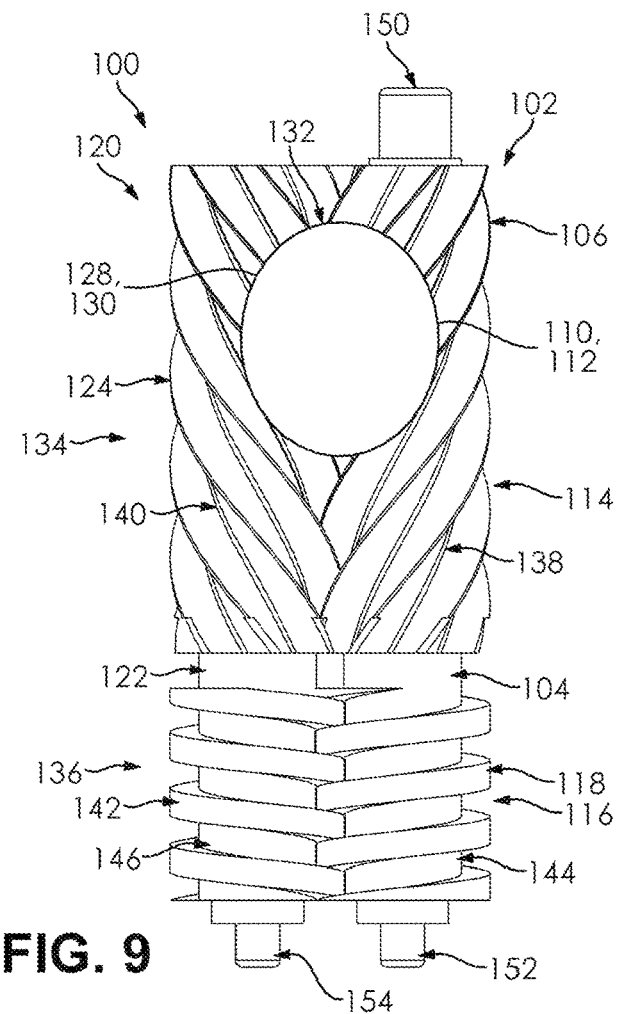
FIG. 9 is a top plan view of the first juicing gear and a second juicing gear, according to certain embodiments, showing the first exposed cavity and a second exposed cavity aligned to form a produce aperture.

While still referring to FIGS. 9-16, the second teeth 124 can have a second top surface 126 with a second exposed cavity 128. The second exposed cavity 128 can be formed on the second top surface 126. The second exposed cavity 128 can be configured to receive the portion 103 of the produce 101. The second exposed cavity 128 can include a second leading edge 130. The second leading edge 130 can be configured to bite or dig into the produce 101 periodically upon the second juicing gear 120 rotating in the second direction, thereby separating, cutting, or splitting the portion 103 of the produce 101 from the remainder 105 of the produce 101, as shown in FIGS. 10-13. In certain examples, the second exposed cavity 128 can be aligned with the first exposed cavity 110 to form a produce aperture 132, as shown in FIGS. 9 and 18. In certain examples, the produce aperture 132 can have a substantially circular shape. It should be appreciated that a skilled artisan can select different shapes for the produce aperture 132 to facilitate receiving the portion 103 of the produce 101, within the scope of this disclosure.

In operation, when the user disposes the produce 101 adjacent to the first juicing gear 102 and the second juicing gear 120, the produce aperture 132 can periodically receive the portion 103 of the produce 101, as the first juicing gear 102 rotates in the first direction and the second juicing gear 120 rotates in the second direction, as shown in FIGS. 10-16; e.g., where the first juicing gear 102 and the second juicing gear 120 are counter-rotating. When the portion 103 of the produce 101 is received by the produce aperture 132, the first leading edge 112 and the second leading can cooperatively bite or dig into the produce 101, as the first juicing gear 102 continues to rotate in the first direction and the second juicing gear 120 continues to rotate in the second direction. Desirably, this can militate against the physical strain on the user, as the amount of force needed to hold the produce 101 against the first juicing gear 102 and the second juicing gear 120 can be reduced as the portions 103 of the produce 101 get removed by cooperative cutting and pinching actions of the first exposed cavity 110 and the second exposed cavity 128.

With reference to FIGS. 9-10, the second main body 122 can have a second grinding portion 134 and a second screw portion 136. The second grinding portion 134 can include the second teeth 124, the second top surface 126, and the second exposed cavity 128. In certain embodiments, the first grinding portion 114 of the first juicing gear 102 can have a plurality of first teeth valleys 138 and the second grinding portion 134 of the second juicing gear 120 can have a plurality of second teeth valleys 140. Each of the first teeth valleys 138 can be disposed between two of the first teeth 106, and can receive one of the second teeth 124. Each of the second teeth valleys 140 can be disposed between two of the second teeth 124, and can receive one of the first teeth 106. Desirably, this can permit the first teeth 106 to interlock with the second teeth 124. Certain embodiments, for example, can include where the first teeth 106 and the second teeth 124 are configured as cooperative, interlocking helical structures. It should be appreciated that one skilled in the art can employ other methods for interlocking the first teeth 106 with the second teeth 124, as desired.

While still referring to FIGS. 9-10, the second screw portion 136 can have a second thread 142. The second thread 142 can be configured to squeeze, press, and/or knead the portion 103 of the produce 101 and/or the remainder 105 of the produce 101, as the second juicing gear 120 rotates in the second direction. In certain examples, the second thread 142 can be configured to push the pulp away from the second grinding portion 134. The second thread 142 of the second screw portion 136 can interlock with the first thread 118 of the first screw portion 116. In certain examples, the first screw portion 116 can have a first screw valley 144 and the second screw portion 136 can have a second screw valley 146. The first screw valley 144 can follow the first thread 118, and can receive a portion of the second thread 142. The second screw valley 146 can follow the second thread 142, and can receive a portion of the first thread 118. Desirably, this can permit the first thread 118 to interlock with the second thread 142. This can also permit the first thread 118 and the second thread 142 to be configured to cooperatively squeeze, press, and/or knead the portion 103 of the produce 101 and/or the remainder 105 of the produce 101, as the first juicing gear 102 rotates in the first direction and the second juicing gear 120 rotates in the second direction. It should be appreciated that one skilled in the art can employ other methods for interlocking the first thread 118 with the second thread 142, within the scope of this disclosure.

As shown in FIGS. 9-10, in certain examples, a portion of the first thread 118 of the first grinding portion 114 can be disposed in the second screw valley 146 of the second thread 142. By having the first thread 118 disposed in the second screw valley 146, the second juicing gear 120 can drive the first juicing gear 102, thereby causing the first juicing gear 102 to rotate in the second direction as the first juicing gear 102 rotates in the first direction. However, it should be appreciated that a skilled artisan can employ other mechanisms and methods for driving the second juicing gear 120 to rotate in the second direction, within the scope of this disclosure.

In certain embodiments, the first juicing gear 102 has a first knob 150 and a second knob 152, as shown in FIGS. 1-9. The first knob 150 can be configured to engage first a portion of the juicer and the second knob 152 can be configured to engage with second portion of the juicer to hold the first juicing gear 102 on a first axis. With reference to FIGS. 9-10, the second juicing gear 120 can have a third knob 154. The third knob 154 can be configured to engage with a third portion of the juicer to hold the second juicing gear 120 on a second axis. In addition, the second juicing gear 120 can have a second juicing gear aperture (not shown), which can be configured to engage with the motor.

This can allow the second juicing gear 120 to rotate in the second direction, as well as drive the first juicing gear 102 in the first direction via the second screw valley 146 engaging with the first thread 118. However, it should be appreciated that a skilled artisan can employ different mechanisms to drive the first juicing gear 102 in the first direction and the second juicing gear 120 in the second direction, within the scope of this disclosure.

Now referring to FIGS. 17-18, the juicer 100 can also include an inlet aperture 148. The inlet aperture 148 can be configured to receive the produce 101. The first juicing gear 102 and the second juicing gear 120 can be disposed below and adjacent to the inlet aperture 148, as shown in FIG. 11. This can permit the produce 101 to pass through the inlet aperture 148 to contact the first juicing gear 102 and the second juicing gear 120. In certain embodiments, the inlet aperture 148 can periodically align with the produce aperture 132, as the first juicing gear 102 rotates in the first direction and the second juicing gear 120 rotates in the second direction, as shown in FIG. 18. Desirably, the user can easily push the produce 101 through the inlet aperture 148, so that the produce aperture 132 can periodically receive the portion 103 of the produce 101, as the first juicing gear 102 rotates in the first direction and the second juicing gear 120 rotates in the second direction. As mentioned previously, this can allow the produce 101 to be cut or split into chunks, thereby militating against strain on the user in feeding produce into the juicer 100. In addition, in certain embodiments, the shape of the produce aperture 132 can substantially correspond with the shape of the inlet aperture 148 to facilitate an easier insertion process of the produce 101 from the inlet aperture 148 into the produce aperture 132.

With reference to FIG. 19, an embodiment of a method 200 for using the juicer 100 for juicing the produce 101 is shown. The method 200 can have a step 202 of providing the juicer 100, which can include the first juicing gear 102 and the second juicing gear 120. In a step 204, the first juicing gear 102 can be rotated in the first direction and the second juicing gear 120 can be rotated in the second direction. The first juicing gear 102 and the second juicing gear 120 can be rotated using a variety of methods. The portion 103 of the produce 101 can be disposed in the first exposed cavity 110 and the second exposed cavity 128 periodically, as the first juicing gear 102 rotates in the first direction and the second juicing gear 120 rotates in the second direction, in a step 206. In certain embodiments, the produce 101 can be disposed through the inlet aperture 148 to dispose the portion 103 of the produce 101 in the first exposed cavity 110 and the second exposed cavity 128. As mentioned above, the first exposed cavity 110 and the second exposed cavity 128, when aligned, can form the produce aperture 132. Therefore, the produce aperture 132 can periodically receive the portion 103 of the produce 101 in the step 206. The first leading edge 112 and the second leading edge 130 can bite the portion 103 of the produce 101 from the remainder 105 of the produce 101, as the first juicing gear 102 continues to rotate in the first direction and the second juicing gear 120 continues to rotate in the second direction, in a step 208. In a step 210, the first teeth 106 and the second teeth 124 can crush the portion 103 of the produce 101 and/or the remainder 105 of the produce 101, as the first juicing gear 102 continues to rotate in the first direction and the second juicing gear 120 continues to rotate in the second direction, thereby releasing the juice from the produce 101.

EXAMPLES

A test of a juicer 100 constructed in accordance with the present technology was conducted to determine if the first juicing gear 102 with the first exposed cavity 110 and the second juicing gear 120 with the second exposed cavity 128 are effective in juicing 500 grams of carrots while also militating against undesirable stress on the user, as shown in TABLE 1.

TABLE 1

| Model | Juice | Pulp | Juicing rate |
|---|---|---|---|
| Twin Gear Juicer | 269 g | 204 g | 53.80% |
| Juicer 100 | 272 g | 202 g | 54.40% |

A second test of the juicer 100 was conducted to determine if the first juicing gear 102 with the first exposed cavity 110 and the second juicing gear 120 with the second exposed cavity 128 was effective in juicing 500 grams of celery, as shown in TABLE 2.

TABLE 2

| Model | Juice | Pulp | Juicing rate |
|---|---|---|---|
| Twin Gear Juicer | 394 g | 75 g | 78.80% |
| Juicer 100 | 405 g | 68 g | 81% |

As shown in TABLE 1 and TABLE 2, the tests were conducted with a traditional twin gear juicer as a control. Both tests demonstrated that the juicer 100 can be more effective at juicing sturdy produce, such as carrots and celery. In addition, the users felt reduced physical strain using the juicer 100.

Advantageously, the juicer 100 and method 200 can facilitate the juicing of study produce 101. In particular, the first exposed cavity 110 and the second exposed cavity 128 can split the produce 101 into chunks, thereby allowing the chunks to be more easily ground. Desirably, this can militate against the physical strain on the user, as the amount of force needed to hold the produce 101 against the first juicing gear 102 and the second juicing gear 120 are reduced as portions 103 of the produce 101 are removed by the first exposed cavity 110 and the second exposed cavity 128.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail. Equivalent changes, modifications and variations of some embodiments, materials, compositions, and methods can be made within the scope of the present technology, with substantially similar results.

What is claimed is:
1. A juicer for juicing a produce, comprising:
    a first juicing gear including a first main body configured to rotate in a first direction, the first main body having a plurality of first teeth including a first top surface with a first exposed and continuous cavity formed on the first top surface of multiple teeth of the plurality of first teeth but not an entirety of the plurality of first teeth, the first exposed and continuous cavity configured to receive a portion of the produce, and the first exposed and continuous cavity having a first leading edge, the first exposed and continuous cavity spanning the first top surface of the multiple teeth of the plurality of first teeth but not the entirety of the plurality of first teeth; and a second juicing gear having a second main body configured to rotate in a second direction, the second main body having a plurality of second teeth including a second top surface with a second exposed and continuous cavity formed on the second top surface of the plurality of second teeth, the second exposed and continuous cavity configured to receive the portion of the produce, and the second exposed and continuous cavity having a second leading edge, wherein the second leading edge is configured to bite the portion of the produce from a remainder of the produce, as the second juicing gear rotates in a second direction, and wherein the plurality of second teeth is configured to crush at least one of the portion of the produce and the remainder of the produce, as the second juicing gear rotates in the second direction, thereby releasing juice from the produce, wherein the first main body of the first juicing gear includes a first grinding portion and a first screw portion, the first grinding portion having the plurality of first teeth including the first top surface with the first exposed and continuous cavity formed on the first top surface of the plurality of first teeth, the first screw portion having a first thread, wherein the second main body of the second juicing gear includes a second grinding portion and a second screw portion, the second grinding portion having the plurality of second teeth including the second top surface with the second exposed and continuous cavity formed on the second top surface of the plurality of second teeth, the second screw portion having a second thread, wherein the first leading edge of the first exposed and continuous cavity and the second leading edge of the second exposed and continuous cavity face each other to form a produce aperture and interlock to bite the portion of the produce from a remainder of the produce and the first teeth of the first main body and the second teeth of the second main body crush the portion of the produce, such that the portion of the produce is first bit and then crushed by only the first main body and the second main body, and wherein the produce aperture extends as a through hole through the first juicing gear and the second juicing gear from a top of the first juicing gear and the second juicing gear to a bottom of the first juicing gear and the second juicing gear when the first leading edge of the first exposed and continuous cavity and the second leading edge of the second exposed cavity face each other to form the produce aperture through hole.

2. The juicer of claim 1, wherein each of the plurality of first teeth has a first slanted tooth trace.

3. The juicer of claim 1, wherein the first main body of the first juicing gear includes a first grinding portion and a first screw portion, the first grinding portion having the plurality of first teeth including the first top surface with the first exposed and continuous cavity formed on the first top surface of the plurality of first teeth, the first screw portion having a first thread.

4. The juicer of claim 1, wherein each of the plurality of second teeth has a second slanted tooth trace.

5. The juicer of claim 1, wherein the plurality of first teeth of the first juicing gear interlock with the plurality of second teeth of the second juicing gear.

6. The juicer of claim 5, wherein the first juicing gear has a plurality of first teeth valleys, each of the plurality of first teeth valleys disposed between two of the first teeth, and each of the plurality of first teeth valleys configured to receive one of the plurality of second teeth of the second juicing gear.

7. The juicer of claim 6, wherein the second juicing gear has a plurality of second teeth valleys, each of the plurality of second teeth valleys disposed between two of the second teeth, and each of the plurality of second teeth valleys configured to receive one of the plurality of first teeth of the first juicing gear.

8. The juicer of claim 1, wherein the second main body of the second juicing gear includes a second grinding portion and a second screw portion, the second grinding portion having the plurality of second teeth with the second exposed and continuous cavity, the second screw portion having a second thread.

9. The juicer of claim 8, wherein the first thread of the first juicing gear interlocks with the second thread of the second juicing gear.

10. The juicer of claim 9, wherein the first juicing gear has a first screw valley, the first screw valley configured to receive the second thread of the second juicing gear.

11. The juicer of claim 10, wherein the second juicing gear has a second screw valley configured to receive the first thread of the first juicing gear.

12. The juicer of claim 1, wherein the juicer includes an inlet aperture disposed above the first juicing gear and the second juicing gear, and the produce aperture is configured to periodically align with the inlet aperture, thereby allowing the produce to be disposed through the inlet aperture and the portion of the produce to be periodically received by the produce aperture when the first juicing gear and the second juicing gear rotate.

13. The juicer of claim 1, wherein the produce aperture is configured to receive the portion of the produce periodically when the first juicing gear and the second juicing gear rotate, and wherein the first leading edge and the second leading edge are configured to cooperatively bite into the produce when the first juicing gear and the second juicing gear rotate, thereby separating the portion of the produce from a remainder of the produce.

14. The juicer of claim 1, wherein the produce aperture has a substantially circular shape.

15. The juicer of claim 1, wherein the first direction is opposite to the second direction.

16. A method for using a juicer for juicing a produce, comprising:

providing a juicer having a first juicing gear and a second juicing gear, a first juicing gear including a first main body having a plurality of first teeth including a first top surface with a first exposed and continuous cavity formed on the first top surface of multiple teeth of the plurality of first teeth but not an entirety of the plurality of first teeth, and the first exposed and continuous cavity having a first leading edge, the first exposed and continuous cavity spanning the first top surface of the multiple teeth of the plurality of first teeth but not the entirety of the plurality of first teeth, the first exposed and continuous cavity having a first leading edge, the first exposed and continuous cavity spanning the first top surface of the multiple teeth of the plurality of first teeth but not the entirety of the plurality of first teeth, and a second juicing gear having a second main body having a plurality of second teeth including a second top surface with a second exposed and continuous cavity formed on the second top surface of multiple teeth of the plurality of second teeth but not an entirety of the plurality of second teeth, and the second exposed and continuous cavity having a second leading edge, the second exposed and continuous cavity spanning the second top surface of the multiple teeth of the plurality of second teeth but not the entirety of the plurality of second teeth, wherein the first main body of the first juicing gear includes a first grinding portion and a first screw portion, the first grinding portion having the plurality of first teeth including the first top surface with the first exposed and continuous cavity formed on the first top surface of the plurality of first teeth, the first screw portion having a first thread, wherein the second main body of the second juicing gear includes a second grinding portion and a second screw portion, the second grinding portion having the plurality of second teeth including the second top surface with the second exposed and continuous cavity formed on the second top surface of the plurality of second teeth, the second screw portion having a second thread, wherein the first leading edge of the first exposed and continuous cavity and the second leading edge of the second exposed cavity face each other to form a produce aperture and interlock to bite the portion of the produce from a remainder of the produce and the first teeth of the first main body and the second teeth of the second main body crush the portion of the produce, such that the portion of the produce is first bit and then crushed by only the first main body and the second main body, and wherein the produce aperture extends as a through hole through the first juicing gear and the second juicing gear from a top of the first juicing gear and the second juicing gear to the bottom of the first juicing gear and the second juicing gear when the first leading edge of the first exposed and continuous cavity and the second leading edge of the second exposed cavity face each other to form the produce aperture through hole;

rotating the first juicing gear in a first direction and the second juicing gear in a second direction;

disposing a portion of the produce into the first exposed and continuous cavity and the second exposed and continuous cavity periodically, as the first juicing gear rotates in the first direction and the second juicing gear rotates in the second direction;

biting, by the first leading edge and the second leading edge, the portion of the produce from a remainder of the produce, as the first juicing gear rotates in the first direction and the second juicing gear rotates in the second direction;

crushing, by the plurality of first teeth and the plurality of second teeth, at least one of the produce and the remainder of the produce, as the first juicing gear rotates in the first direction and the second juicing gear rotates in the second direction, thereby releasing juice from the produce.

* * * * *